L. BERK.
AUTOMATIC CAR BRAKING MECHANISM.
APPLICATION FILED JULY 1, 1920.
1,386,488.
Patented Aug. 2, 1921.
2 SHEETS—SHEET 1.
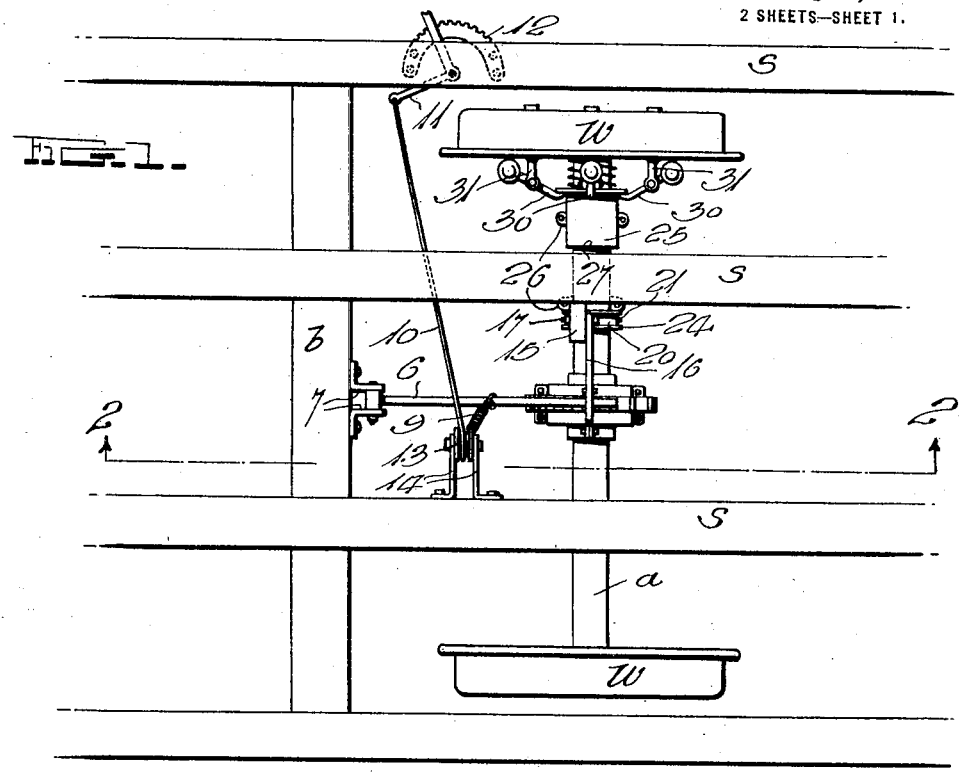
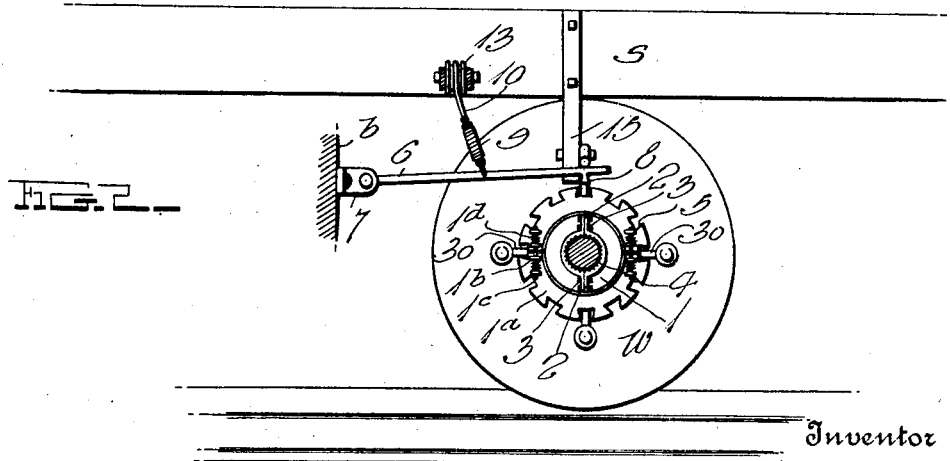
Witness
H. Woodard
Inventor
Louis Berk
By H. B. Wilson &c.
Attorneys

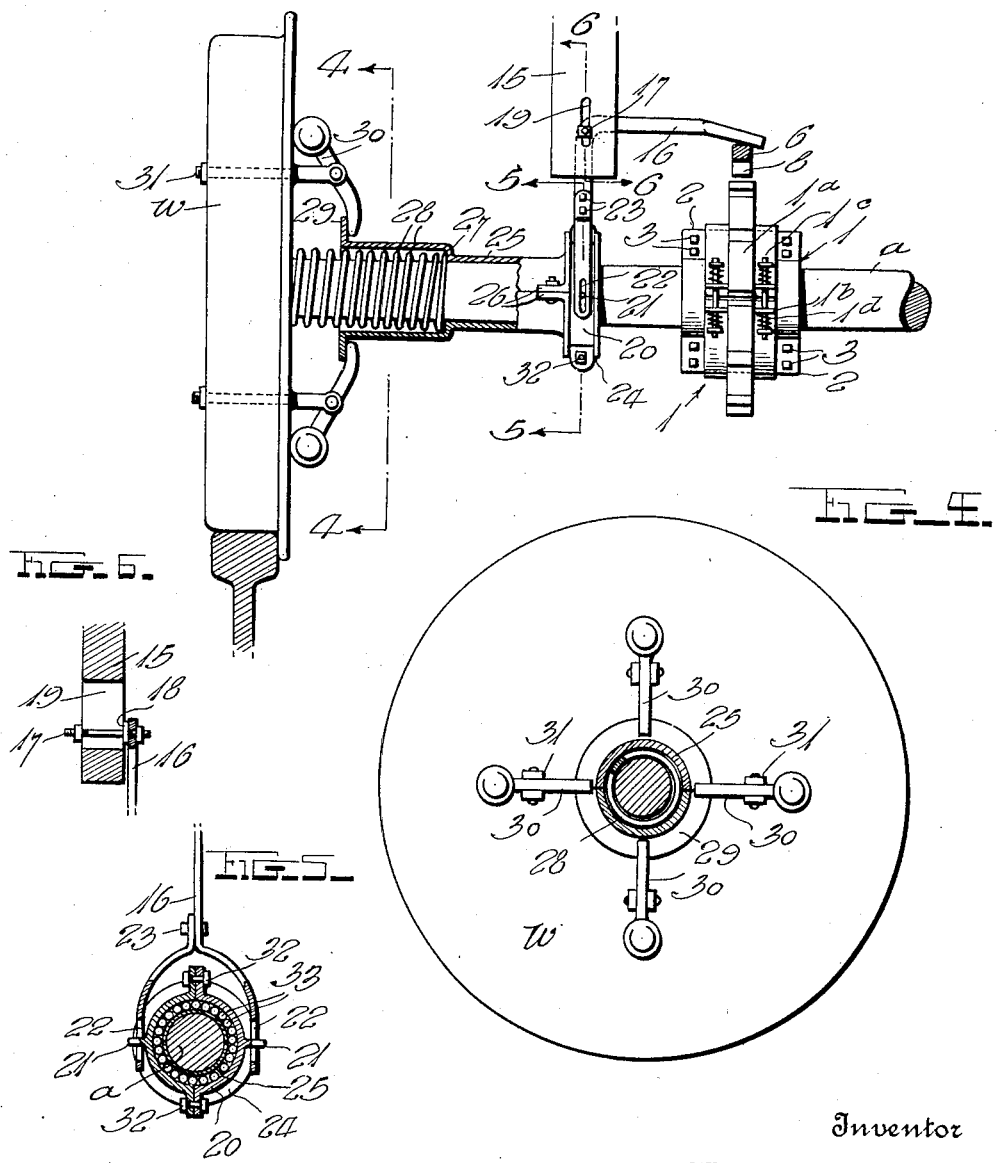

UNITED STATES PATENT OFFICE.

LOUIS BERK, OF ALSTOWN, WASHINGTON.

AUTOMATIC CAR-BRAKING MECHANISM.

1,386,488.  Specification of Letters Patent.  Patented Aug. 2, 1921.

Application filed July 1, 1920. Serial No. 393,226.

*To all whom it may concern:*

Be it known that I, LOUIS BERK, a citizen of the United States, residing at Alstown, in the county of Douglas and State of Washington, have invented certain new and useful Improvements in Automatic Car-Braking Mechanism; and I do declare the following to be a full, clear, and exact description of the invention, such as will enable others skilled in the art to which it appertains to make and use the same.

This invention relates to automatic car braking mechanism, and more specifically to an improved device for braking a pair of wheels of a railway-car and for retaining the wheels against rotation until the direction of movement of the car is reversed.

One object of this invention is to provide an improved device for automatically stopping a runaway car when it has exceeded a predetermined speed limit, and for automatically releasing a car from the braking or locking means when the car is moved in the direction opposite to that in which it was moving when automatically stopped.

A further object is to provide adjusting means to control the locking mechanism, for making the latter effective under varying conditions of speed, load, etc.

Further objects and advantages will be pointed out or implied in the following details of description in connection with the accompanying drawings in which:

Figure 1 is a top plan view of my improved braking device in connection with a pair of wheels and portions of the body of a car.

Fig. 2 is a sectional view along the line 2—2 of Fig. 1.

Fig. 3 is an enlarged detail view, partly in section, one of the car-wheels being omitted.

Fig. 4 is a sectional view along the line 4—4 of Fig. 3.

Fig. 5 is a sectional view along the line 5—5 of Fig. 3.

Fig. 6 is a sectional view along the line 5—6 of Fig. 3.

Referring to these drawings in detail, in which similar reference characters correspond with similar parts throughout the several views, and in which the axle $a$, wheels $w$, bolster $b$ and stringers $s$ of the car may be of ordinary construction, the invention consists in the construction and arrangement of parts which will now be described as follows:

According to this embodiment of the invention, the braking device is intended for attachment to an axle and wheel without removing either wheel from the axle, and without changing the construction of the car except in a few minor respects which will appear hereinafter. With this object in view, a part 1 of the brake is formed in two separable halves, being provided with apertured flanges 2 and with bolts 3 through these apertured flanges for securing the two halves in unison and causing them to clamp and thereby unite with the axle $a$. To prevent this brake-wheel or rotary member of the brake from moving with relation to the axle, its halves are provided with teeth or ridges 4 which penetrate or depress the surface of the axle $a$. This wheel or rotary brake member 1 includes an outer rim $1^a$ which is provided with a peripheral series of shoulders 5, which jut or extend toward one another at their outer extremity, so as to provide substantially dovetail notches or recesses therebetween. An arm or lever 6 is pivotally connected to the bearing 7 which is secured to the bolster $b$, and this member 6 constitutes the other part of the brake, that is, the part which coacts with the rotary part 1 and its support $b^7$ for stopping the wheels and axle from rotating, and securing them against rotation. The arm 6 is provided with a substantially dovetail lug 8 which is movable into and out of the spaces between the shoulders 5, and it will be seen that when the lug 8 is engaged with one of the shoulders 5, it is secured against movement about its pivot, for a purpose which will presently appear.

The spring 9 is connected to the lever 6, a chain or cable 10 is connected to the spring 9, and this cable is also connected to a lever 11 which is pivotally mounted on one of the outer sills or stringers $s$ and is adapted to be held in different adjustments by means of a tooth segment 12. A roller or guide 13 is journaled in a bearing 14 or on a pivot supported by this bearing, the bearing 14 being secured to one of the inner sills or stringers $s$. The chain or cable 10 extends from this guide 13 and coacts therewith and with the spring 9 for adjustably and yieldingly holding the arm or lever 6 in spaced relation to the brake-wheel 1.

A bearing 15 is secured to and depends from one of the inner sills or stringers s, and a bell-crank-lever 16 is pivotally and adjustably secured to this bearing or hanger by means of a pivot or bolt 17 such as illustrated, in detail, in Fig. 6. By providing the bolt 17 with an integral flange or collar 18, this bolt can be adjusted to different vertical positions in a slot 19 of the bearing or hanger 15, thereby avoiding necessity for securing accurate adjustment of the hanger 15 with relation to the body of the car, while permitting accurate adjustment of the bell-crank-lever with relation to the device which actuates it and to the arm 6 actuated thereby, as will presently appear. This lever 16 has a substantially horizontal arm which extends over the arm 6 and bears on top of the latter, and the other arm of this lever extends downwardly and engages with the opposite sides of the shifting collar 20 which is provided with diametrically opposite studs 21, these studs extending through slots 22 in the bifurcated lower end of this depending arm of the lever 16. One of the furcations of the lever 16 is removably secured to the other by means of screws or bolts 23, so that the slots 22 may be easily engaged with the studs 21 in an obvious manner.

The collar 20 is secured between two flanges 24 of a sleeve 25 which extends around the axle $a$ and is slidable along this axle. This sleeve is longitudinally or axially split or formed in two halves which are provided with apertured flanges 26 through which bolts or screws extend for securing the halves in unison after this sleeve has been passed laterally onto the axle $a$. The sleeve 25 is provided with an enlarged portion which terminates in a shoulder or abutment 27 against which the spring 28 is seated, the other end of this spring being seated against the adjacent wheel $w$. The sleeve 25 is provided with a flange 29 which extends radially outward from its outer end, and a set of weighted levers 30 engage with the flange 29 for moving it outward against the action of the spring 28. It should be understood in this connection, that the weighted levers 30 are actuated by centrifugal force which varies with the speed at which the axle $a$ and wheels $w$ rotate. As a convenient, cheap and efficient means of pivotally connecting levers 30 to one of the wheels $w$, a bifurcated bolt 31 is provided for each lever 30, each of these levers being pivoted between the bifurcations of a bolt 31.

The collar 20 is formed of two separable halves which are secured to one another by means of bolts 32, ball bearings 33 may be provided between the collar 20 and sleeve 25, as shown in Fig. 5.

To prevent too great a shock and probable damage, the rim $1^a$ is frictionally engaged with the periphery of the hub portion of the wheel 1. This rim is formed of two segments having apertured flanges $1^b$ through which bolts $1^c$ extend. Springs $1^d$ coact with these bolts and flanges to press the segments of the rim $1^a$ against the hub. Therefore, when the lug 8 engages with a shoulder of the wheel 1, the rim $1^a$ is stopped suddenly, but the hub continues to rotate until the friction of the rim on the hub overcomes the momentum of the car and gradually stops the car.

From the foregoing description, it will be seen that the device can be quickly and easily attached to a car without altering the car except by boring holes through one of the wheels $w$ to receive the bolts 31, and providing openings in the beams or stringers and bolsters for receiving the bolts or screws which secure the bearings 7, 14 and 15 thereto, also providing holes for the pivot of the lever 11 and for the securing means of the segment 12.

When the device is attached to a car of which the bolster $b$ is pivoted with relation to the body of the car, a universal joint may be provided at 7 or a depending connection or hanger may be provided on the body of the car for pivotally connecting the lever 6 thereto. In other words, the lever 6 may be pivotally connected to any suitable or appropriate support extraneous to the axle and wheels.

The operation of the device is as follows:

Assuming that a car has broken loose or has escaped from a switch-track and is running away, the weighted levers 30 will be centrifugally actuated by momentum of the car wheels, and where the momentum has exceeded a certain speed limit, the levers 30 will have moved the sleeve 25 outward a sufficient distance for this sleeve and the coöperating lever 16 to have moved the lug 8 of the arm 6 into contact with the brake-wheel 1. One of the notches of the brake-wheel will receive the lug 8, and the latter will be drawn to the bottom of this notch by reason of the jutting or inclined surfaces 5 and the corresponding surfaces of the lug 8. This engagement of the brake parts 1 and 6 effectively stops the rim or brake-band $1^a$ against rotation, and after the wheels have rolled a short distance on the railway track, the friction of the rim $1^a$ will stop the car. When the car has stopped, the sleeve 25 and lever 16 return to their normal positions, while the spring 9 tends to return to its normal position, but can not return because of the interlocking engagement of the inclined jutting surfaces previously described. Therefore, the braking device will remain effective until the car is moved in the direction opposite to that in which it was moving when stopped by this automatic braking device. When moved in the opposite direction the spring 9 will immediately return the lever or arm 6 to its normal ineffective position.

It is not intended to limit this invention to the exact details of construction and arrangement as described and illustrated, but changes may be made within the scope of the inventive ideas as implied and claimed.

What I claim as my invention is:

1. In a braking mechanism for securing an axle and wheels of a railway-car against rotation, a sleeve around said axle, centrifugally actuated means to move said sleeve along said axle, a part of a brake mounted between and rotatable with said wheels, a part of a brake mounted for movement into engagement with the first said part of the brake for coöperating therewith to stop rotation of the wheels, and means including a lever connected to and operable by said sleeve for effecting said movement of the second said part of the brake.

2. In a braking mechanism for securing an axle and wheels of a railway-car against rotation, a sleeve around said axle, and provided with an outwardly extending flange, centrifugally actuated levers engaged with said flange for moving said sleeve along said axle, fulcrums on one of said wheels and carrying said levers, a spring compressed between said one of the wheels and said sleeve for pressing the latter to its normal position, a brake including a part which is mounted between and rotatable with said wheels, and means including a lever for operating said brake, the last said means being correlated with and operable by said sleeve.

3. The structure defined by claim 1, the first said part of the brake being provided with means to interlock with the second said part of the brake for securing these parts in mutual engagement after the wheels have been stopped thereby.

4. The structure defined by claim 1, and means connected to the second said part of the brake for adjusting the latter relative to the first said part of the brake, this latter means including a spring which permits this brake part to be moved from its different adjusted positions into braking engagement with the first said part of the brake.

5. In a braking mechanism for securing an axle and wheels of a railway-car against rotation, a brake-wheel on said axle, a brake-lever pivoted to a part of the car extraneous of said axle and wheels, a sleeve on said axle, a shifting collar in which said sleeve is journaled for rotation and held against relative axial movement, a bearing supported by and depending from the body of the car, a bell-crank-lever pivoted to said bearing and having a bifurcated arm extending down from said bearing and engaging with opposite sides of said shifting collar, the other arm of said bell-crank-lever extending across and bearing on said brake-lever, centrifugally actuated levers pivotally connected to one of said wheels and engaged with said sleeve for moving the latter outward along said axle and thereby causing said bell-crank-lever to move said brake-lever into braking engagement with said brake-wheel, and means connected to said brake-lever for adjusting the latter relative to said brake-wheel, this adjusting means including a spring which permits this brake lever to be moved from its different adjusted positions into engagement with said brake-wheel.

6. In a braking mechanism for securing an axle and wheels of a railway-car against rotation, a brake-wheel on said axle, a brake-lever, a sleeve on said axle, a shifting collar in which said sleeve is journaled for rotation and held against relative axial movement, a bearing supported by and depending from the body of the car, a bell-crank-lever pivoted to said bearing and having a bifurcated arm extending down from said bearing and slidingly engaging with opposite sides of said shifting collar and adapted to be shifted by the latter while compensating for relative up and down movement of said collar and bearing, the other arm of said bell-crank-lever extending across and bearing on said brake-lever, centrifugally actuated levers pivotally connected to one of said wheels and engaged with said sleeve for moving the latter outward along said axle and thereby causing said bell-crank-lever to move said brake-lever into braking engagement with said brake-wheel, means connected to said brake-lever for adjusting the latter relative to said brake-wheel, the pivotal support of said bell-crank lever being vertically adjustable and provided with means to secure it in its different adjustments, for the purpose specified.

7. In a braking device attachable to a railway car, an axially split sleeve, an axially split collar, and an axially split brake-wheel, these elements being attachable to an axle of the car by movement laterally of the axle so as to place them around said axle, said sleeve being normally journaled in said collar, said brake wheel being provided with means for securing it against rotation on the axle, weighted levers provided with means to pivotally connect them to a wheel on said axle in a manner to be actuated by centrifugal force, said levers being correlated with said sleeve in a manner to actuate the latter, a brake-arm attachable to the car in position to move into braking engagement with said brake-wheel, and means including a lever to operatively connect said shifting collar to said brake-arm for moving the latter into braking engagement with said brake-wheel.

8. In a braking mechanism for stopping rotation of an axle of a railway-car, a hub on said axle, a rim mounted for frictional sliding movement on said hub and provided with shoulders, a detent engageable with said shoulders for stopping rotation of said rim, and means controllable by traveling motion of the car to effect the engagement of said detent with said shoulders.

In testimony whereof I have hereunto set my hand.

LOUIS BERK.